(12) United States Patent
Rizzi et al.

(10) Patent No.: US 9,028,766 B2
(45) Date of Patent: May 12, 2015

(54) PLATE HEAT EXCHANGER FOR ISOTHERMAL CHEMICAL REACTORS

(75) Inventors: Enrico Rizzi, Casnate con Bernate (IT); Ermanno Filippi, Castagnola (CH); Mirco Tarozzo, Ligornetto (CH)

(73) Assignee: Casale SA (CH)

( * ) Notice: Subject to any disclaimer, the term of this patent is extended or adjusted under 35 U.S.C. 154(b) by 93 days.

(21) Appl. No.: 13/383,787

(22) PCT Filed: Jul. 7, 2010

(86) PCT No.: PCT/EP2010/059732
§ 371 (c)(1),
(2), (4) Date: Jan. 12, 2012

(87) PCT Pub. No.: WO2011/018281
PCT Pub. Date: Feb. 17, 2011

(65) Prior Publication Data
US 2012/0114530 A1    May 10, 2012

(30) Foreign Application Priority Data

Aug. 13, 2009  (EP) ................................... 09167856

(51) Int. Cl.
*B01J 19/00*    (2006.01)
*B01J 8/02*    (2006.01)
(Continued)

(52) U.S. Cl.
CPC .............. *F28D 9/0031* (2013.01); *B01J 8/0285* (2013.01); *B01J 2208/0015* (2013.01);
(Continued)

(58) Field of Classification Search
CPC ...... B01J 8/00; B01J 7/00; B01J 2219/00006; B01J 2219/0004; B01J 2219/00094; B01J 2219/00873; B01J 19/00; B01J 19/0013; B01J 19/24; F28F 27/00; F28F 27/02; F28F 2250/06; F28F 13/00; F28F 13/06; F28F 9/00; F28F 9/02; F28F 9/029; F28F 3/12; F28F 1/00; F28F 1/10; F28F 7/16; F28F 7/1607; F28F 9/0031; F28F 15/00; F28F 2020/0078; F28F 1/0333; F28F 1/05366; F28F 1/05391; F28F 1/05375; B23P 15/26
USPC ......... 422/129, 198, 600, 630, 644, 647, 649; 165/96, 100, 157, 168, 172, 173
See application file for complete search history.

(56) References Cited

U.S. PATENT DOCUMENTS

| 6,998,570 B1 | 2/2006 | Watkins et al. |
| 2005/0061490 A1 | 3/2005 | Filippi et al. |

(Continued)

FOREIGN PATENT DOCUMENTS

| WO | 2009/027671 A2 | 3/2009 |
| WO | WO 2009/0682445 | * 6/2009 |

OTHER PUBLICATIONS

International Preliminary Report on Patentability issued in connection with PCT/EP2010/059732, Nov. 18, 2011.

(Continued)

*Primary Examiner* — Natasha Young
(74) *Attorney, Agent, or Firm* — Akerman LLP (57) ABSTRACT

A radial-flow plate heat exchanger (5) embedded in the catalytic bed of an isothermal chemical reactor (1) has heat exchange plates (10) comprising fluid passages (13) between a first metal sheet (20) and a second metal sheet (21) joined by perimeter weld seams (23) on a first surface (A) of the plate, a feeding channel (14) and a collecting channel (15) for the heat exchange fluid are formed with suitable metal sheets which are seam welded (25) directly to the opposite surface (B) of the plate, this structure allows the manufacturing of the plate (10) with an automated seam welding process, such as laser beam welding.

17 Claims, 4 Drawing Sheets

(51) Int. Cl.
- *B23K 11/093* (2006.01)
- *B23K 15/00* (2006.01)
- *B23K 26/20* (2014.01)
- *B23K 26/24* (2014.01)
- *B23K 26/28* (2014.01)
- *F28F 9/02* (2006.01)
- *B01J 19/24* (2006.01)
- *B01J 8/00* (2006.01)
- *B23P 15/26* (2006.01)
- *F28D 1/00* (2006.01)
- *F28D 1/02* (2006.01)
- *F28D 1/03* (2006.01)
- *F28D 7/16* (2006.01)
- *F28D 9/00* (2006.01)
- *F28D 15/00* (2006.01)
- *F28F 1/00* (2006.01)
- *F28F 3/12* (2006.01)

(52) U.S. Cl.
CPC .......... *B23K 11/093* (2013.01); *B23K 15/0053* (2013.01); *B23K 26/206* (2013.01); *B23K 26/246* (2013.01); *B23K 26/28* (2013.01); *B23K 2201/14* (2013.01); *F28F 9/026* (2013.01); *F28F 2275/06* (2013.01)

(56) References Cited

U.S. PATENT DOCUMENTS

| | | | |
|---|---|---|---|
| 2005/0252645 A1 | 11/2005 | Filippi et al. | |
| 2006/0196650 A1 | 9/2006 | Filippi et al. | |
| 2006/0278367 A1* | 12/2006 | Dawson | 165/84 |
| 2007/0169923 A1* | 7/2007 | Rizzi et al. | 165/157 |
| 2007/0261831 A1 | 11/2007 | Filippi et al. | |
| 2008/0314574 A1* | 12/2008 | Filippi et al. | 165/167 |
| 2010/0189609 A1 | 7/2010 | Barbieri et al. | |
| 2010/0288380 A1* | 11/2010 | Sicre et al. | 137/561 R |
| 2010/0303682 A1 | 12/2010 | Rizzi et al. | |
| 2011/0005076 A1 | 1/2011 | Hallmann | |

OTHER PUBLICATIONS

Response to Written Opinion filed in connection with PCT/EP2010/059732, Oct. 24, 2011.

* cited by examiner

PLATE HEAT EXCHANGER FOR ISOTHERMAL CHEMICAL REACTORS

This application is a national phase of PCT/EP2010/059732, now WO 2011/018281, filed Jul. 7, 2010, and claims priority to EP 09167856.5, filed Aug. 13, 2009, the entire contents of both of which are hereby incorporated by reference.

FIELD OF THE INVENTION

The invention relates to isothermal chemical reactors comprising a plate heat exchanger embedded in a catalytic bed. The invention relates in particular to a plate heat exchanger for chemical reactors, a reactor equipped with said heat exchanger, and a method for manufacturing the plates of the heat exchanger. The invention is applicable for example to methanol or ammonia converters. A preferred application is a radial-flow gas/gas heat exchanger in an isothermal reactor.

PRIOR ART

A plate heat exchanger for isothermal radial or axial-radial chemical reactors is disclosed in WO 03/035241. Heat exchange plates are arranged in a catalytic reactor and have long sides parallel to the axis of the reactor, and radial short sides. The heat exchange fluid is distributed and collected by longitudinal fluid pipes arranged on the long sides of the plates. The plate is formed with two metal sheets and has a number of welding seams parallel to the short sides defining radial fluid channels. Each fluid channel may have internal baffles to define a serpentine fluid path.

An isothermal reactor with a plate heat exchanger, suitable to operate under relevant inside/outside pressure difference, is further disclosed in EP 2 062 640.

The above known art is satisfying for many applications, but requires a significant and expensive amount of manual welding operations, in order to join the fluid pipes to the long sides of the plates, and provide the relevant welding seams. The cylindrical inlet and outlet pipes, for example, cannot be welded with the available equipment for automated seam welding, used for welding the rest (body) of the heat exchanger plate.

SUMMARY OF THE INVENTION

The invention is aimed to provide a novel arrangement for a plate heat exchanger for use in isothermal chemical reactors, adapted to a manufacturing method with lap seam welding techniques, such as laser beam welding, in order to reduce the manufacture cost.

According to the invention, there is provided a heat exchanger for use in an isothermal chemical reactor, the heat exchanger having a plurality of heat exchange plates, each plate comprising a first metal sheet and a second metal sheet providing respectively a first side surface and an opposite second side surface of the plate, a heat exchange fluid feeder and a heat exchange fluid collector, and a plurality of internal fluid passages between the first and second metal sheet, characterized in that:
the first metal sheet and the second metal sheet are joined by weld seam(s) made on the first side surface,
said fluid feeder and said fluid collector are formed with a feed channel and a collecting channel, said channels having welding portions parallel to said second side surface and joined to the second metal sheet by weld seams made on said second side surface of the plate.

The welding portions parallel to said second side surface allow automated seam welding of the channels directly to said second side surface. The first side surface and second side surface of the metal sheets forming the heat exchange plate are appropriately plane and smooth to allow the automated seam welding process.

In a preferred embodiment, the feed channel and the collecting channel of each plate are box-shaped ducts formed with respective metal sheets. More preferably, the feed channel and the collecting channel are formed with omega-shaped metal sheets. The feed channel and collecting channel are in fluid communication with the internal fluid passages of the plate by means of a plurality of pass-through apertures of the second metal sheet forming the plate.

According to a further aspect of the invention, the feeder comprises a further feed pipe internal to the feed channel. The internal feed pipe is free to move longitudinally with respect to the outside channel, to compensate for thermal elongation. A suitable circulation of the heat exchange fluid is preferably induced in the feed channel, by providing the internal feed pipe with outlet openings opposite to said pass-through apertures of the second metal sheet.

The transverse fluid channels formed between the first and the second metal sheet may be separate or partly in fluid communication with each other, according to embodiments of the invention.

In some embodiments of the invention, a suitable spacer metal sheet is provided between the first and the second metal sheets, to define the transverse fluid passages. The weld seams on the first side are made to penetrate through the full thickness of the first metal sheet and the intermediate spacer, and through a part of the thickness of the second metal sheet.

A further object of the invention is a heat exchange plate for the manufacture of a plate heat exchanger according to the above. A further object of the invention is an isothermal chemical reactor comprising a catalytic bed and a radial-flow plate heat exchanger embedded in said catalytic bed, the heat exchanger being in accordance with the invention as disclosed above. In a particularly preferred application of the invention, the heat exchanger is a gas/gas exchanger where a fresh gaseous charge inside the plates exchanges heat with the gaseous products of the reaction flowing through the catalytic bed.

The main advantage is that the plates can be manufactured with an automatic lap welding process, such as laser beam welding, electron beam welding, resistance welding or equivalents. The two metal sheets can be welded together, possibly with an intermediate sheet to form the internal fluid passages, with the available automated weld seam processes and equipment. Then, also the fluid feeder and collector can be welded with the same process, contrary to the known plate arrangement where cylindrical side ducts require the more expensive hand-made weldings. The structure of the plates of the heat exchanger is simple and easy to manufacture and then the cost of the heat exchanger is significantly reduced.

A further object of the invention is then a method for manufacturing a heat exchange plate, comprising the following steps:
a first metal sheet and a second metal sheet are joined by making at least a weld seam along a perimeter line with an automatic welding process, to form a plate with transverse internal passages between said first and second metal sheet, the welding process being carried out with a welding device acting on the surface of the first metal sheet;

the plate is overturned so that the surface of the second metal sheet is exposed to the action of the welding device, and a longitudinal fluid feed channel or a longitudinal fluid collecting channel are positioned on the surface of the second metal sheet, said channel having longitudinal welding portions parallel to and in contact with said second side surface, and said channel is seam welded to the surface of the second metal sheet with an automated process by said welding device acting on said welding portions.

In order to form the transverse fluid passages between the metal sheets of the plate, one aspect of the invention is to sandwich an intermediate metal sheet between the first and second metal sheets. The intermediate sheet has cuts corresponding to the internal passages, so that the first and second metal sheets remains spaced away in correspondence of said passages. This method is practical but produces a certain scrap of material, due to provision of large cuts on the intermediate sheet. As an alternative, another aspect of the invention is to provide transverse flutings on the first metal sheets, the flutings being arranged to form the internal fluid passages when said first metal sheet is joined to the second metal sheet. This embodiment has the advantage that the structure is further simplified, comprising only the two metal sheets and the fluid feeder and collector.

A preferred way of carrying out this alternative embodiment comprises the steps of: pressing transversal fluting on the first metal sheet, and seam welding, on the first side, the first metal sheet to the second metal sheet, in order to achieve transverse (radial) channels. Then, the longitudinal fluid channels can be welded on the second side of the plate, as previously described.

A preferred application of the invention is in the field of low-pressure, radial-flow, gas/gas heat exchangers of chemical reactors, such as methanol converters. In the referred gas/gas heat exchanger, the heat exchanger is used to both refrigerate the catalytic bed and pre-heat the fresh charge of the make-up syngas. The term of low-pressure is referred to the difference of pressure between the inside and outside of the plate, which in this case is in the range of few bars.

The features and advantages of the invention will be more evident with the following detailed description of preferred embodiments.

DETAILED DESCRIPTION OF PREFERRED EMBODIMENTS

An isothermal chemical reactor 1 (FIG. 1) contains a plate heat exchanger 5 embedded in a substantially annular catalytic bed 2. The heat exchanger 5 has a plurality of heat exchange plates 10 which are arranged radially in the catalytic bed 2. The plates 10 are connected to a suitable piping arrangement (not shown) of a heat exchange fluid. A fresh charge of gaseous reactants is fed into a space 3 around the catalytic bed 2 and flows radially through the bed. The products are collected in a central pipe 4.

Figures 1, 2:
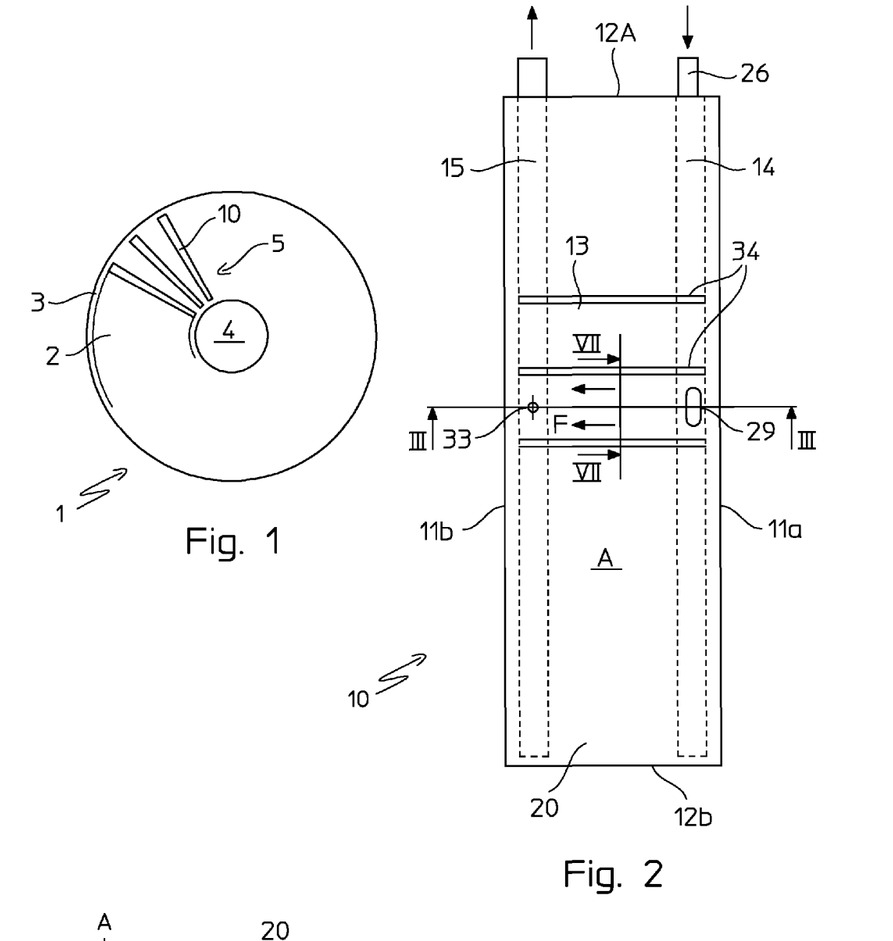
FIG. 1 is a simplified cross section of an isothermal reactor containing a catalytic bed and a radial-flow heat exchanger, according to the invention.
FIG. 2 is a front view of a heat exchange plate according to the invention, and of a heat exchange plate of the reactor of FIG. 1.
Figure 3:
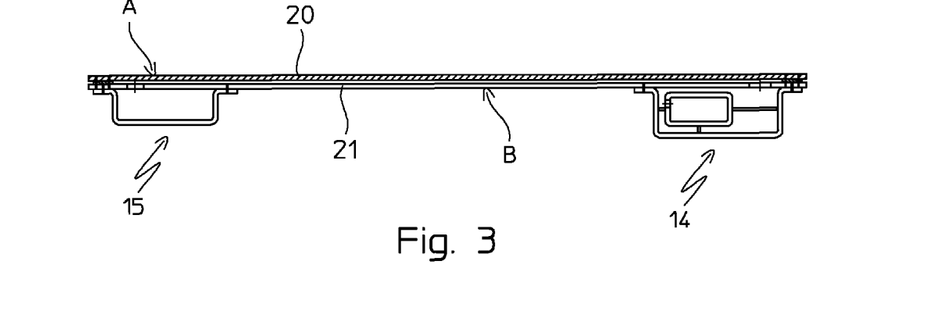
FIG. 3 is a cross section according to line III-III of FIG. 2.

One of the heat exchange plates 10 is shown in FIG. 2. The plate 10 has substantially a rectangular shape with longitudinal sides 11a, 11b and transverse sides 12a, 12b. A feeder 14 and a collector 15 for the heat exchange fluid are arranged parallel and close to the longitudinal sides 11a and 11b. The plate 10 further comprises a plurality of transverse internal passages 13 for the heat exchange fluid so that, in operation, the heat exchange fluid flows from the feeder 14 into the internal passages 13, and is collected by the collector 15.

The structure of the plate 10 is better viewed in the FIGS. 3 to 7. The plate 10 is composed mainly of a first metal sheet 20 joined to a second metal sheet 21. The metal sheets 20 and 21 provide the opposite side surfaces A and B of the plate 10, respectively. The metal sheets 20 and 21 are optionally spaced by portions 22a, 22b of an intermediate metal sheet (spacer) 22, shaped so as to form the passages 13 between the internal faces of the main metal sheets 20, 21. The surfaces A and B are preferably plane and smooth.

Figure 4:
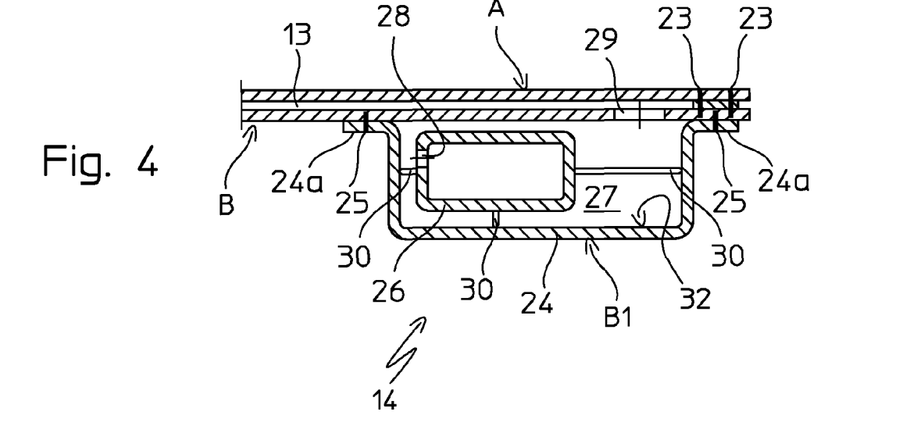
FIG. 4 is a detail of FIG. 3.
Figure 5:
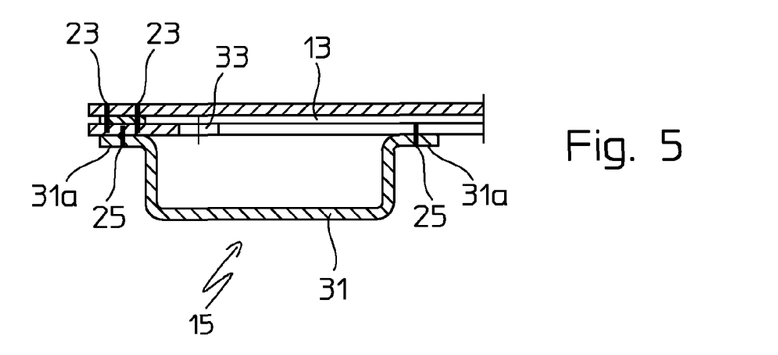
FIG. 5 is a detail of FIG. 3.
Figure 6:
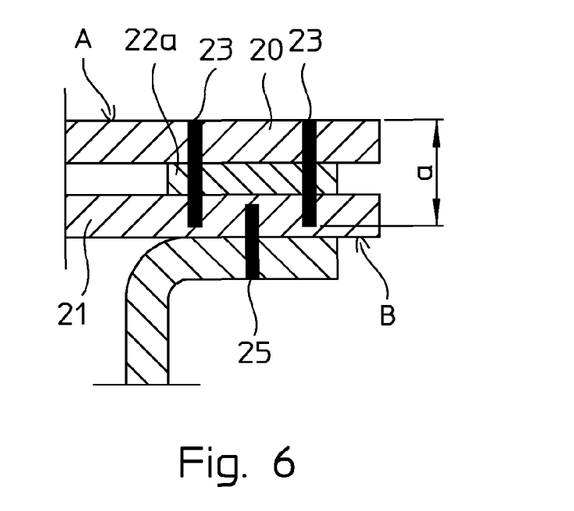
FIG. 6 is a detail of FIG. 3.
Figure 7:
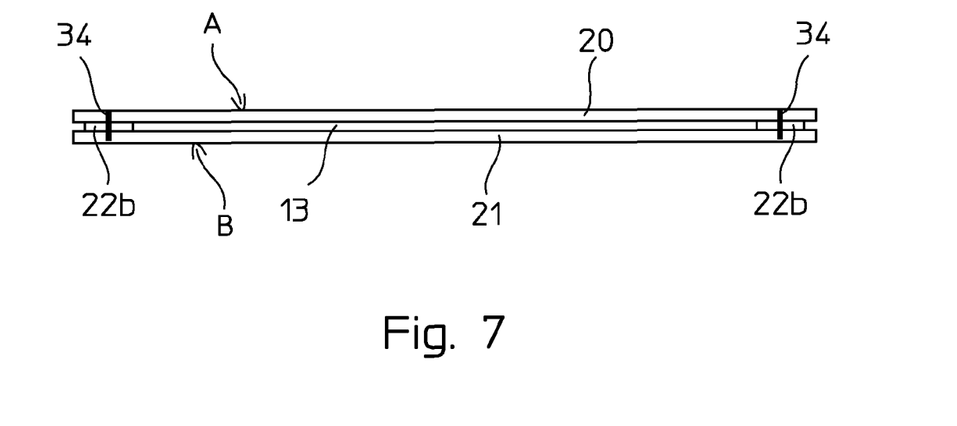
FIG. 7 is a cross-section according to line VII-VII of FIG. 2.

The metal sheets 20, 21 are joined by at least one continuous perimeter weld seam 23 (FIGS. 4, 5). In some embodiments of the invention, a double weld seam may be provided for a better sealing of the passages 13. A weld seam 23 starts from the surface A and penetrates through the thickness of the metal sheets 20, the intermediate sheet 22, and part of the thickness of the opposite sheet 21. The depth a (FIG. 6) of the weld seams 23 is slightly less than the overall thickness of the sandwich formed by plates 20, 21 and 22, so that the smoothness of surface B remains substantially unaffected by the provision of weld seams 23.

The feeder 14 and collector 15 are joined by further weld seams 25 on the opposite surface of the plate 10, namely the surface B of the second metal sheet 21.

FIG. 4 shows a detail of a preferred embodiment of the feeder 14. An omega-shaped metal sheet 24 has longitudinal welding portions as wings 24a, which are parallel to the plate surface B, and joined to said surface B by the weld seams 25. Said weld seams 25 (FIG. 6) penetrate through the thickness of the respective wing 24a of the metal sheet 24, and part of the thickness of the metal sheet 21.

The omega-shaped metal sheet 24, when joined to the metal sheet 21, defines a longitudinal fluid distribution chamber 27, which is in communication with the fluid passages 13 of the plate 10 by means of slots 29 open in the second metal sheet 21. Preferably the second plate 21 has one slot 29 for each of the channels 13.

In the shown preferred embodiment, the feeder 14 further comprises an inner pipe 26, located inside the fluid distribution chamber and kept in position by suitable spacers 30 abutting against the inner surface 32 of the omega-shaped sheet 24.

The spacers 30 can be made with a number of metal plates welded to the pipe 26. The spacers 30 are not fixed to the surface 32, so that the inner pipe 26 is free to move longitudinally relative to the sheet 24, to compensate for thermal elongation due to different temperature, in operation, of the pipe 26 and sheet 24, the latter being in contact with the catalytic bed 2.

The fluid distribution chamber is in communication with the transverse fluid passages 13 via the longitudinally aligned slots 29 of the second metal sheet 21; the further feed pipe 26 has fluid outlets 28 in communication with the distribution chamber 27 and opposite to said slots 29. Due to this location of outlets 28, the heat exchange fluid flows on the surface of the sheet 24 before passing into the passage 13 through the slot 29 and, hence, also the outer surface B1 of the feeder 14, in contact with the catalytic bed, is effectively used for heat exchange.

The collector 15 (FIG. 5) is made with another omega-shaped metal sheet 31, with wings 31a joined to the face B of the plate 10 by further weld seams 25. Fluid communication with the passages 13 is provided by a plurality of holes 33 of the metal sheet 21.

In a preferred embodiment, as shown, the weld seams 25 on the face B joining the feeder 14 and collector 15, are provided between the seams of a double weld seam 23 joining the metal sheets 20 and 21 on the opposite face A.

The fluid passages 13 are formed by further, transverse weld seams 34 (FIGS. 2 and 7) between the plates 20, 21 and cross beams 22b of the intermediate plate 22. Said weld seams 34 may be continue or interrupted. In some embodiments of the invention, interrupted weld seams 34 may allow a certain passage of fluid between the parallel channels 13. Interruptions of weld seams 34 are made preferably in correspondence of the weld seams 25, to facilitate the manufacturing process.

Figure 8:
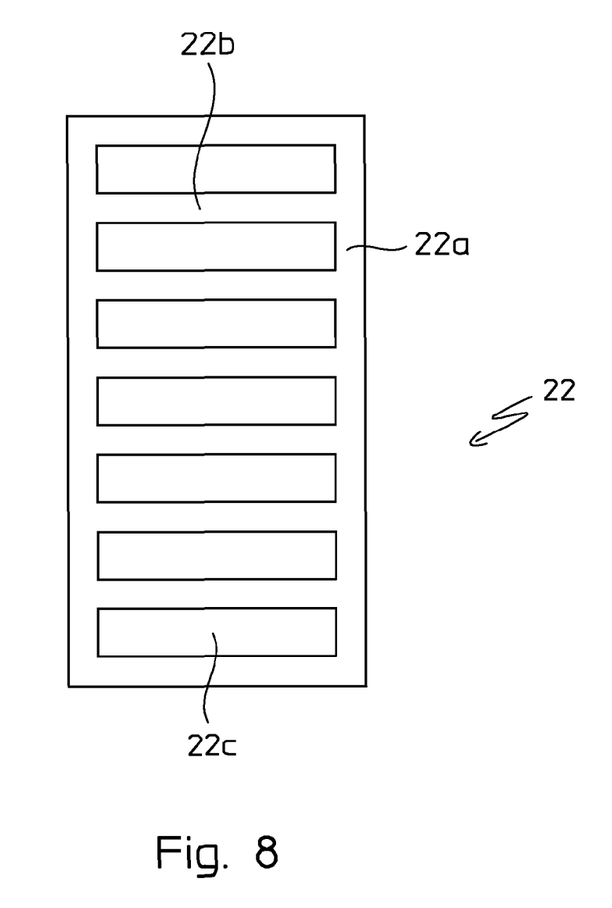
FIG. 8 is a front view of an intermediate sheet for forming the internal fluid passages between the metal sheets of the plate of FIG. 2.

The intermediate plate 22 (FIG. 8) is basically a thin metal sheet with cuts 22c corresponding to the fluid passages 13. The cuts 22c, as apparent from the figure, leave longitudinal beams 22a and cross beams 22b. By sandwiching the plate 22 between the sheets 20 and 21, and making the weld seams 23 and 34, a plate 10 with transverse fluid passages 13 is formed.

Figure 9:
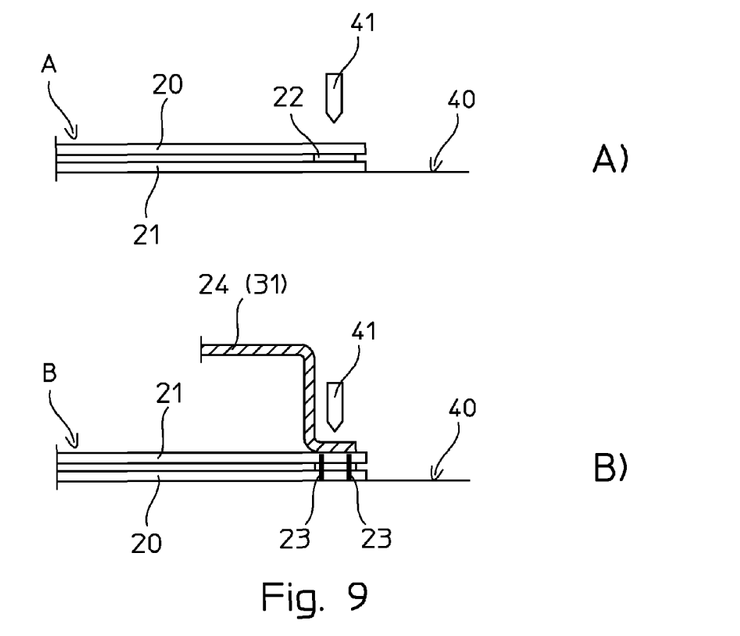
FIG. 9 is a scheme of a manufacturing process of the heat exchange plate of FIG. 2.

A method for the manufacture of the plate 10 is shown in FIG. 9. The sandwich of the plate 10 is formed with the sheets 20, 21 and 22 superimposed on a plane surface 40 where an LBW (laser beam welding) device 41 operates. In a first step, the LBW device 41 forms one or more weld seams 23 on the face A to join the sheets 20 and 21 together, and the transverse weld seams 34 to form the internal fluid passages 13 (FIG. 9-A).

In a second step, the plate 10 is overturned and positioned again on the surface 40, so that the face B is now exposed to the LBW device 41. It should be noted that the surface B is not affected by the previously formed weld seams 23, that penetrate only through a part of the thickness of the sheet 21.

After the overturning of the plate 10, the omega-sheet 24 or 31 is positioned and joined to the sheet 21 with weld seams 25 on the opposite surface B. The step is repeated to form both the weld seams 25 at both sides of the feeder 14 or collector 15 (FIG. 9-B).

Figure 10:
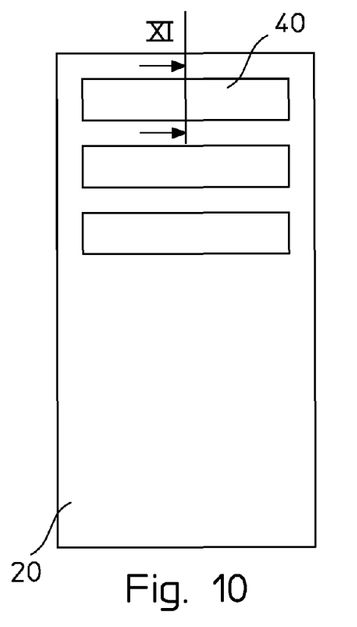
FIG. 10 is a scheme of a metal sheet for another embodiment of the invention.

In a further embodiment of the invention, the intermediate plate 22 is not present. A plurality of transverse flutings 40 (FIG. 10, 11) are formed on the first metal sheet 20 by pressing, preferably cold pressing, so that the fluid passages 13 are formed when the metal sheet 20 is joined directly to the other metal sheet 21. The method for manufacture of the plate 10 comprises the steps of: pressing the metal sheet 20 to form the transversal fluting 40 (FIG. 11); joining the first metal sheet 20 to the second metal sheet 21, by at least one weld seam 23, obtaining the transversal channels 13 between the sheets 20 and 21; seam welding the longitudinal fluid channels 14 and 15 on the plane surface B of the second sheet 21.

Figures 11, 12:
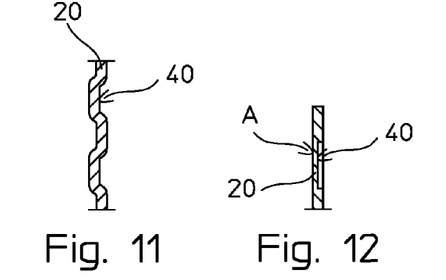
FIG. 11 is a cross section according to line XI-XI of FIG. 10.
FIG. 12 is the cross section as in FIG. 11, according to a further embodiment.

A further and alternative embodiment is possible, as in FIG. 12, where the flutings 40 are machined on the first metal sheet 20 e.g. with a milling process.

Figure 13:
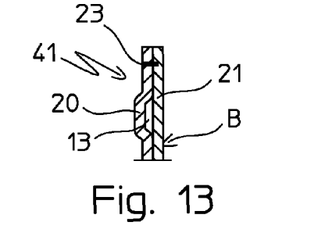
FIG. 13 is a detail of the metal sheets joined to form the heat exchange plate, in one of the embodiments of the invention.

FIG. 13 shows the metal sheet 20 as in FIG. 11, with flutings formed by pressing deformation, joined to the second metal sheet 21. When the metal sheets are joined, the channels 13 appear in correspondence of the flutings 40. A frame portion 41 of the metal sheet 20 is left plane, so as to allow the provision of the weld seam(s) 23. The feeder 14 and collector 15 are then welded to the surface B of the second metal sheet 21.

The plate 10 operates as follows. The heat exchange fluid is fed via the pipe 26 and holes 28 in the channel 27. While flowing from holes 28 to slots 29, the fluid exchange some heat with the surface B1 which is in contact with the catalytic bed. Then, the fluid passes transversely, i.e. with a radial flow relative to the reactor 1 (FIG. 1), through the channel 13 of the plate, as shown by arrows F in FIG. 2, and is collected in the collector 15.

In a preferred application of the invention, the reactor 1 is a methanol converter where a make-up syngas containing hydrogen and carbon oxides is converted into methanol. The fresh make-up syngas is first fed to the heat exchanger 5, before entering the catalytic bed 2, so that the make-up syngas itself acts as the heat exchange fluid. In this case, the heat exchanger 5 is a gas/gas exchanger between the gaseous make-up and the mixture of syngas and products.

Each of the heat exchange plates 10 receives a make-up syngas flow in the feeder 14, which is preheated while passing through the channel 13; the preheated syngas collected at pipes 15 is then fed to the space 3 and reacts while flowing through the catalytic bed 2, being cooled by the preheat of the make-up syngas feed. The pressure outside the plates 10 is the pressure of the catalytic bed, which is substantially the same pressure of the fresh charge flowing inside. The low pressure difference avoids excessive stress on the weld seams.

The invention claimed is:

1. A heat exchanger for use in an isothermal chemical reactor, the heat exchanger having:
    a plurality of heat exchange plates, each plate comprising a first metal sheet and a second metal sheet providing respectively a first side surface and an opposite second side surface of the plate;
    a heat exchange fluid feeder;
    a heat exchange fluid collector; and
    a plurality of internal fluid passages between the first and second metal sheets,
    wherein said first metal sheet and said second metal sheet are joined by one or more first weld seam(s) made on said first side surface,
    wherein said fluid feeder and said fluid collector are formed with a feed channel and a collecting channel, and
    wherein said feed channel and said collecting channel comprise respective welding portions which are parallel to said second side surface and which are joined to the second metal sheet by second weld seams made on said second surface of the plate;
    wherein each plate comprises an intermediate metal sheet which is provided between said first metal sheet and said second metal sheet, to define transverse fluid passages, said first weld seam(s) penetrating through the full thickness of said first metal sheet and intermediate sheet, and through a part of the thickness of said second metal sheet; or said first metal sheet comprises transverse flutings which are arranged to form said internal fluid passages when said first metal sheet is joined to said second metal sheet.

2. The heat exchanger according to claim 1, wherein the feed channel and collecting channel of each plate are in the form of box-shaped ducts.

3. The heat exchanger according to claim 2, wherein the feed channel and collecting channel of each plate are obtained with omega-shaped metal sheets.

4. The heat exchanger according to claim 1, wherein the fluid feeder comprises a further feed pipe internal to the feed channel.

5. The heat exchanger according to claim 4, wherein each plate has a feed pipe forming said fluid feeder, said feed pipe being made of a metal sheet welded to the surface of the second metal sheet, and providing a fluid distribution chamber;

said fluid distribution chamber is in communication with the internal fluid passages via a plurality of longitudinally aligned apertures of the second metal sheet; and a further feed pipe is provided inside an omega-shaped metal sheet and has fluid outlets opposite to said apertures.

6. The heat exchanger according to claim 1, further comprising an annular structure with radially-arranged plates;
each plate having longitudinal sides and short side;
the feeder and collector being arranged longitudinally parallel to the long sides; and
the internal fluid passages being arranged parallel to the short sides, to allow a radial flow of the heat exchange fluid.

7. An isothermal chemical reactor comprising a catalytic bed and a plate heat exchanger embedded in said catalytic bed, the heat exchanger being in accordance with claim 1.

8. The reactor according to claim 7, wherein the heat exchanger is a gas/gas heat exchanger between a fresh gaseous charge flowing inside the plates, and the gaseous reactants flowing through the catalytic bed.

9. The reactor according to claim 8, wherein the reactor is a methanol or ammonia converter.

10. A method for manufacturing a heat exchange plate, comprising the following steps:
a) joining a first metal sheet and a second metal sheet by making weld seams at least along a perimeter line with an automatic welding process, to form a plate with transverse internal passages between said first and second metal sheets, the welding process being carried out with a welding device acting on the surface of the first metal sheet;
b) overturning the plate so that the surface of the second metal sheet is exposed to the action of the welding device,
c) positioning a longitudinal fluid feed channel or a longitudinal fluid collecting channel on the surface of the second metal sheet, said channel having longitudinal welding portions parallel to and in contact with said second side surface, and
d) seam welding said channel to the surface of the second metal sheet with an automated process by said welding device acting on said welding portions;
wherein the transverse internal passages between the first and the second metal sheets are obtained by placing an intermediate metal sheet between said first and second metal sheets, the intermediate sheet having cuts corresponding to the internal passages; or
wherein the transverse internal passages between the first and the second metal sheets are obtained by providing transverse flutings on the first metal sheet, said flutings being arranged to delimit the internal fluid passages when the first metal sheet is joined to the second metal sheet to form said plate.

11. The method according to claim 10, wherein said welding process is selected from the group consisting of laser beam welding, electron beam welding and resistance welding.

12. The method according to claim 10, comprising the steps of:
pressing the first metal sheet so as to form said transversal fluting;
seam welding, on the first side, the first metal sheet to the second metal sheet, in order to form transversal channels between the plates; and
seam welding the longitudinal fluid channels on the second side of the plate.

13. A heat exchanger for use in an isothermal chemical reactor, the heat exchanger having:
a plurality of heat exchange plates, each plate comprising a first metal sheet and a second metal sheet providing respectively a first side surface and an opposite second side surface of the plate;
a heat exchange fluid feeder;
a heat exchange fluid collector; and
a plurality of internal fluid passages between the first and second metal sheets,
wherein said first metal sheet and said second metal sheet are joined by one or more first weld seam(s) made on said first side surface,
wherein said fluid feeder and said fluid collector are formed with a feed channel and a collecting channel, and
wherein said feed channel and said collecting channel comprise respective welding portions which are parallel to said second side surface and which are joined to the second metal sheet by second weld seams made on said second surface of the plate;
wherein the fluid feeder comprises a further feed pipe internal to the feed channel;
wherein each plate has a feed pipe forming said fluid feeder, said feed pipe being made of a metal sheet welded to the surface of the second metal sheet, and providing a fluid distribution chamber;
said fluid distribution chamber is in communication with the internal fluid passages via a plurality of longitudinally aligned apertures of the second metal sheet; and
a further feed pipe is provided inside an omega-shaped metal sheet and has fluid outlets opposite to said apertures.

14. The heat exchanger according to claim 13, wherein:
each plate comprises an intermediate metal sheet which is provided between said first metal sheet and said second metal sheet, to define transverse fluid passages, said first weld seam(s) penetrating through the full thickness of said first metal sheet and intermediate sheet, and through a part of the thickness of said second metal sheet, or:
said first metal sheet comprises transverse flutings which are arranged to form said internal fluid passages when said first metal sheet is joined to said second metal sheet.

15. The heat exchanger according to claim 13, wherein the feed channel and collecting channel of each plate are in the form of box-shaped ducts.

16. The heat exchanger according to claim 13, wherein the feed channel and collecting channel of each plate are obtained with omega-shaped metal sheets.

17. The heat exchanger according to claim 13, further comprising an annular structure with radially-arranged plates;
   each plate having longitudinal sides and short side;
   the feeder and collector being arranged longitudinally parallel to the long sides; and
   the internal fluid passages being arranged parallel to the short sides, to allow a radial flow of the heat exchange fluid.

\* \* \* \* \*